United States Patent [19]

Cheng

[11] 4,152,314

[45] May 1, 1979

[54] PROCESS FOR CONVERTING LEATHERY PHOSPHAZENE POLYMER TO ELASTOMERIC PHOSPHAZENE POLYMER

[75] Inventor: Tai C. Cheng, Akron, Ohio

[73] Assignee: The Firestone Tire & Rubber Company, Akron, Ohio

[21] Appl. No.: 876,384

[22] Filed: Feb. 9, 1978

[51] Int. Cl.$^2$ ............................................... C08K 5/53
[52] U.S. Cl. .............................................. 260/30.6 R
[58] Field of Search .................................. 260/30.6 R

[56] References Cited

U.S. PATENT DOCUMENTS

| 2,866,773 | 12/1958 | Redfarn | 260/30.6 |
|---|---|---|---|
| 3,869,294 | 3/1975 | Lanier et al. | 106/15 FP |
| 3,891,448 | 6/1975 | Braxton et al. | 106/15 FP |
| 3,891,449 | 6/1975 | Braxton et al. | 106/15 FP |

*Primary Examiner*—Harry Wong, Jr.

[57] ABSTRACT

Leathery aryloxy polyphosphazenes are converted to useful elastomers by the presence of relatively low molecular weight oils in said polymers. The oils may be present as a result of the manner in which the polyaryloxyphosphazenes have been prepared or as an intentional addition to the phosphazene polymer.

4 Claims, No Drawings

PROCESS FOR CONVERTING LEATHERY PHOSPHAZENE POLYMER TO ELASTOMERIC PHOSPHAZENE POLYMER

This invention relates to the enhancement of the processability and mechanical properties of poly(aryloxy)-phosphazene homopolymers and copolymers, whereby originally leathery polymer which is difficult to process is converted to readily processable elastomeric material.

More particularly it relates to the production of polymer with a small but significant content of low molecular weight phosphazene oils.

The addition of fluoroalkoxyphosphazene oils to poly(fluoroalkoxyphosphazene) materials is described in U.S. Pat. No. 3,943,088 which issued Mar. 9, 1976 to Kyker and Antkowiak. As noted in that patent the physical properties of such materials were substantially improved in both compounded and cured polyphosphazene stock, by the addition of between 2 and 50 parts by weight of low molecular weight fluoroalkoxyphosphazene oil per 100 parts of polymer.

The present invention is directed to the improvement of polyphosphazenes in which the substituents on the —P=N— chain are aryloxy or substituted aryloxy groups, of the types described in U.S. Pat. No. 3,856,713 issued Dec. 24, 1974.

In one conventional method of preparing such materials, e.g. as described in Example 3 of U.S. Pat. No. 3,370,020 issued Feb. 20, 1968 and Example 1 of U.S. Pat. No. 3,856,713 the poly(dichlorophosphazene) is precipitated from solution, i.e. coagulated, by addition of a non-solvent to the solution in which it is present in dissolved form, and is thereafter derivatized.

It has been found that the properties of the derivatized material appear to depend in part on the nature of the $(NPCl_2)_n$ polymer which is derivatized to the aryloxy substituted polymer and this in turn appears to depend on the previous history of the $(NPCl_2)_n$ polymer.

Briefly, in the present invention it has been found that the presence of between about 10 and 70 parts by weight of relatively low molecular weight phosphazene oils (MW = ~700 to ~500,000 as determined by GPC) for each 100 parts by weight of relatively high molecular weight aryloxypolyphosphazene will provide an elastomeric material, while its absence results in a leathery, difficult to process material.

The oils may be present either as a deliberate addition to the polymer (e.g. similar to the teachings in U.S. Pat. No. 3,943,088) or they may be present because the dichlorophosphazene starting material was processed so as to retain them in the material to be derivatized.

The following examples are representative of prefered embodiments of the invention and are not intended to limit the same.

Polydichlorophosphazene was prepared by the classical method in which $PCl_5$ and $NH_4Cl$ are reacted, e.g. as described in U.S. Pat. No. 3,780,162 issued Dec. 18, 1973 and in the literature noted in the background section of that patent. The polydichlorophosphazene product obtained consists principally of low molecular weight cyclic oligomers and when heated under the right conditions these are converted to essentially linear $(NPCl_2)_n$ polymer in which "n" has a value up to 50,000 or more. The preparation of useful derivatives of the thermally polymerized polydichlorophosphazene is achieved by methods described in the following United States patents and elsewhere in the literature:

| Inventor | U.S. Pat. No. | Issued |
|---|---|---|
| Allcock et al | 3,370,020 | February 20, 1968 |
| Rose | 3,515,688 | June 2, 1970 |
| Reynard et al | 3,700,629 | October 24, 1972 |
| Rose et al | 3,702,833 | November 14, 1972 |
| Reynard et al | 3,853,794 | December 10, 1974 |
| Reynard et al | 3,856,712 | December 24, 1974 |
| Rose et al | 3,856,713 | December 24, 1974 |
| Reynard et al | 3,883,451 | May 13, 1975 |
| Cheng et al | 3,972,841 | August 3, 1976 |

In one known method the $(NPCl_2)_n$ polymer mixture which results when the $(NPCl_2)_3$ trimer and other cyclic oligomers are thermally polymerized is purified as described in U.S. Pat. No. 3,755,537 issued Aug. 28, 1973, i.e. by coagulation from solution by addition of hexane or heptane and recovered. This separates the high molecular weight polydichlorophosphazene polymer product from most of the lower molecular weight material including unreacted cyclic trimer and tetramer and other cyclic oligomers or low molecular weight linear polymer.

In another known method, described in Canadian Pat. No. 965,928 the unreacted cyclic trimer is separated from the polymerization products by sublimation of the trimer. This leaves the high molecular weight polymer together with any low molecular weight oils which are not sublimed with the cyclic trimer.

The invention will become apparent from the examples which follow in which preferred embodiments are set forth by way of example and is not intended to be limited by said examples.

EXAMPLE I

PREPARATION OF DICHLOROPHOSPHAZENE POLYMER FROM DICHLOROPHOSPHAZENE TRIMER $(NPCl_2)_3$

One thousand parts of dichlorophosphazene trimer, previously purified by distillation or recrystallization, were degassed and sealed in a suitable, thick-walled vessel and heated to 250° C. for 4–8 hours. Polymerization was terminated when the reaction mixture ceased to flow (when the vessel is inverted) at 250° C. Upon cooling, the resulting product was divided into two batches each of which was identical to the other. In one of the batches the unpolymerized cyclic $(NPCl_2)_3$ trimer was separated from the linear polydichlorophosphazene $(NPCl_2)_n$ polymer by sublimation, as described in the above noted Canadian Pat. No. 965,928. In the other batch, the unpolymerized cyclic trimer $(NPCl_2)_3$ was separated from the linear polydichlorophosphazene $(NPCl_2)_n$ polymer in which $n>20$ by the coagulation method described in U.S. Pat. No. 3,755,537.

EXAMPLE I(A)

PREPARATION OF ELASTOMERIC POLYARYLOXYPHOSPHAZENE

The batch of $(Cl_2PN)_n$ polymer isolated by sublimation (Example I) contained a mixture consisting of 60 percent of a high molecular weight material (Tg — 65° C.) (MW ranges from 600,000 to 5,000,000, as determined by GPC) and 40 percent of a relatively low molecular weight oily material (MW as determined by GPC ranges from 348 to 500,000). The total mixture (high molecular weight and oil) (400g, 6.88 mole) was dissolved in about 2400 ml of toluene and added to a predried solution of sodium aryloxide. The aryloxide was prepared from sodium metal (176g, 7.65 equiv.) phenol (388g, 4.13 moles), p-ethylphenol (414.8g, 3.4 moles) and o-allylphenol (112g, 0.835 moles) in THF. The reaction mixture was then heated to 300° F. for 24 hours. Upon cooling, the polymer was isolated by coagulation in a 1:1 ratio of methanol and water (1 gallon of methanol and 1 gallon of water). The resulting polymer after washing and drying was an elastomer which had a Tg of −19° C. and an inherent viscosity (DSV) of 1.21 (Table I-A).

EXAMPLE I(B)

PREPARATION OF LEATHERY POLYARYLOXYPHOSPHAZENE

The batch of $(Cl_2PN)_n$ polymer (400g, 6.88 moles) isolated by coagulation in Example I was dissolved in about 2400 ml of toluene. Derivatization of this poly(dichlorophosphazene) was performed in accordance with the procedure set forth in Example I(A). The resulting polymer was a leathery material which had a Tg of −20.5° C. and an inherent viscosity (DSV) of 1.94 (Table I-B).

It will be apparent that derivatives produced from the coagulated polydichlorophosphazene are markedly different from those produced from the material purified by sublimation as may be seen from the following table, summarizing the results of the above examples.

TABLE I

| Effect of Isolation Method of Chloropolymer on Final Polymer Physical State | | | | | |
|---|---|---|---|---|---|
| Isolation Method | Physical State | DSV | Tg° C. | % Na | % Cl |
| I-A | Sublimation Elastomer | 1.21 | −19 | 0.20 | 0.26 |
| I-B | Coagulation Leather | 1.94 | −20.5 | 0.043 | 0.14 |

DSV is an abbreviation for Dilute Solution Viscosity and is substantially the same as inherent viscosity.

While not wishing to be bound by any specific theoretical explanation, it is believed that during sublimation the low molecular weight oils remain with the linear polyphosphazene and hence do not become separated from the polydichlorophosphazene which is subsequently derivatized, whereas in the coagulation method the low molecular weight oils remain in solution and are not present in the coagulated material which is subsequently derivatized. This view is reinforced by the following examples.

EXAMPLE II

Aryloxypolyphosphazenes C and D (Table II) were prepared utilizing batches of chloropolymer which had been purified by sublimation as described in Example I. These derivatized polymers were prepared substantially in accordance with the procedure set forth in Example I(A) except that during derivatization the ratio of phenoxy to p-ethyl phenoxy groups employed in polymer C was 50/50, while the ratio of phenoxy to p-ethyl phenoxy groups employed in polymer D was 30/70. Both polymers were elastomeric in nature despite this difference in ratios. The polymers were then dissolved in tetrahydrofuran (THF) and coagulated with hexane. The resultant coagulated polymers (designated E and F) were both leathery. The low molecular weight oils appeared to remain in solution in the THF hexane solution. As can be seen from Table II, the dilute solution viscosities (DSV) of the elastomers and leathers are quite different.

TABLE II

| DIFFERENCE BETWEEN ELASTOMER AND LEATHER | | | | | |
|---|---|---|---|---|---|
| Elastomer | | | Leather | | |
| Code | DSV | Tg° C. | Code | DSV | Tg° C. |
| C | 1.70 | −17 | E | 2.18 | −17.5 |
| D | 1.78 | −22.5 | F | 2.87 | −20.0 |

When low molecular phosphazene oils were mixed on a mill with polymers E and F they were reconverted to elastomeric materials similar to polymers C and D.

The invention is further illustrated by the following examples which are not intended to limit the invention.

EXAMPLE III

SEPARATION OF A LOW MOLECULAR WEIGHT PHOSPHAZENE OIL FROM AN ELASTOMERIC POLYARYLOXYPHOSPHAZENE

The polyaryloxyphosphazene (30g) from Example I(A) was dissolved in 400 ml of THF and added to 2000 ml of hexane slowly. The high molecular weight polymer was separated from the dissolved low molecular weight oil by means of filtration. Upon drying the filtered material, a leathery polymer G (Table III) was obtained with a weight of 18g. The filtrate was then evaporated down to dryness. A brown oily material with a molecular weight of approximately 1400 and a Tg of −23.5° C. was obtained (Table III).

TABLE IV

CHANGING A LEATHERY POLYARYLOXYPHOSPHAZENE TO AN ELASTOMERIC POLYARYLOXYPHOSPHAZENE

The leathery polymer G (5g) which was isolated in Example III, was mixed with 1.4g of oil (from Example III also) on a mill for 30 minutes. A soft elastomer was then obtained with a Tg° C. of −19. In addition, we have also mixed 5g of the leathery polymer I-B (see Table I) with 1.2g of oil (from Example III) on a mill. Again, an elastomer was obtained. Both results are shown in Table III.

TABLE III

| EFFECT OF OIL ON POLYMER PHYSICAL STATE | | | |
|---|---|---|---|
| LEATHER + OIL ⇌ ELASTOMER | | | |
| ex. | | | |
| I-(A) | Elastomer (30g) (Polymer A) | → Leather (18g) (Polymer G) | + Oil (10g) Tg = −23.5° C. MW = approximately 1400 |
| III | Leather (5g) (Polymer G) | + | Oil (1.4g) → Elastomer like A Tg = −23.5° C. MW = approximately 1400 |
| IV | Leather (5g) (Polymer B) | + | Oil (1.2g) → Elastomer like A Tg = −23.5° C. MW = approximately 1400 |

By suitably proportioning the amount of oil added back to said leathery high molecular weight polyaryloxyphosphazene, the leathery product can be converted to an elastomeric product with desired physical characteristics.

As indicated in the above discussion, the present invention is applicable to a variety of aryloxy phosphazene polymers such as those described in the patents noted above.

These polymers may be represented by the general formula

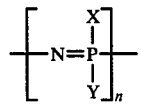

wherein X and Y each represent aryloxy or substituted aryloxy groups, and some of the groups may contain unsaturation to facilitate curing of the polymer and wherein n = 20 to 50,000.

Having now described the preferred embodiments of the invention, it is not intended that it be limited except as required by the appended claims.

I claim:

1. A process for converting leathery polyaryloxyphosphazenes to elastomeric polyaryloxyphosphazenes which comprises blending an effective amount up to about 70 parts by weight of a polyaryloxyphosphazene oil having a molecular weight of between 700 and about 500,000 as determined by GPC with a leathery polyaryloxyphosphazene having a molecular weight of from 600,000 to 5,000,000 as determined by GPC and recovering the resulting elastomer.

2. The process of claim 1 wherein between 10 and 70 parts by weight of said oil is added to said leathery material.

3. The process of claim 1 wherein the polyaryloxyphosphazene is a phenoxy, alkylphenoxy phosphazene.

4. A process for converting leathery polyaryloxyphosphazenes to elastomeric polyaryloxyphosphazenes which comprises:
(a) reacting a linear poly(dihalophosphazene) represented by the formula $(NPHAl_2)_n$ in which Hal is either Cl or Br and n is an integer between 20 and 50,000 or more, with at least one aromatic compound represented by the formula $M(OR)_x$ in which M is an alkali or alkaline earth metal, x is the valence of said metal and R is an aryl group, thereby producing a mixture of polyaryloxyphosphazenes consisting of polyaryloxyphosphazenes having molecular weights of from 600,000 to 5,000,000 and polyaryloxyphosphazene oils having molecular weights of 700 to 500,000 as determined by GPC;
(b) dissolving the polyaryloxyphosphazene products produced by said reaction;
(c) separating the higher molecular weight polyaryloxyphosphazenes from the lower molecular weight polyaryloxyphosphazene oils by adding a non-solvent for said higher molecular weight polyaryloxyphosphazenes thereby coagulating said higher molecular weight polyaryloxyphosphazenes;
(d) separating the solution of lower molecular weight polyaryloxyphosphazene oil from said coagulated higher molecular weight polyaryloxyphosphazene products;
(e) separately recovering the lower molecular weight polyaryloxyphosphazene oil and the coagulated higher molecular weight polyaryloxyphosphazene products; and then
(f) adding back from 10 to 70 parts by weight of said oil to said higher molecular weight leathery polyaryloxyphosphazene to produce an elastomeric product.

* * * * *